(12) United States Patent
Voets et al.

(10) Patent No.: US 11,001,651 B2
(45) Date of Patent: May 11, 2021

(54) POLYPROPYLENE FOR USE IN BOPP APPLICATIONS

(71) Applicant: SABIC GLOBAL TECHNOLOGIES B.V., Bergen Op Zoom (NL)

(72) Inventors: Patrick Elisabeth Luc Voets, Geleen (NL); Abderrahman Meddad, Riyadh (SA); Henrica Norberta Alberta Maria Steenbakkers-Menting, Geleen (NL); Akhlaq Moman, Riyadh (SA)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 16/340,918

(22) PCT Filed: Oct. 16, 2017

(86) PCT No.: PCT/EP2017/076269
§ 371 (c)(1),
(2) Date: Apr. 10, 2019

(87) PCT Pub. No.: WO2018/069541
PCT Pub. Date: Apr. 19, 2018

(65) Prior Publication Data
US 2019/0276567 A1    Sep. 12, 2019

(30) Foreign Application Priority Data
Oct. 14, 2016   (EP) ..................................... 16193894

(51) Int. Cl.
*C08F 10/06*     (2006.01)
*C08F 110/06*    (2006.01)
(Continued)

(52) U.S. Cl.
CPC ............ *C08F 10/06* (2013.01); *B29C 55/005* (2013.01); *B29C 55/12* (2013.01); *C08F 110/06* (2013.01);
(Continued)

(58) Field of Classification Search
CPC ........ C08F 10/06; C08F 110/06; C08F 55/12; C08J 5/18; B29C 55/12
See application file for complete search history.

(56) References Cited

U.S. PATENT DOCUMENTS

2007/0080485 A1* 4/2007 Kerscher ................. C08L 23/12
                                                    264/564
2008/0161515 A1  7/2008 Blackmon et al.
2010/0273641 A1* 10/2010 Chen ..................... C08F 110/06
                                                    502/126

FOREIGN PATENT DOCUMENTS

EP        0775722 A1    5/1997
WO     2013041470 A1    3/2013
(Continued)

OTHER PUBLICATIONS

Lin, "Structure-Property Relationship of Polyolefins Used as Packages and Adhesives," Doctoral Thesis, Case Western Reserve University (Jan. 2011). (Year: 2011).*
(Continued)

*Primary Examiner* — Catherine S Branch
(74) *Attorney, Agent, or Firm* — Cantor Colburn LLP

(57) ABSTRACT

The invention relates to a biaxially oriented polypropylene (BOPP) film comprising a propylene homopolymer or propylene-ethylene copolymer having an ethylene content of at most 1.0 wt % based on the propylene-ethylene copolymer having an Mw/Mn in the range from 5.0 to 12, wherein Mw stands for the weight average molecular weight and Mn stands for the number average weight and wherein Mw and Mn are measured according to ASTM D6474-12, an XS in (Continued)

the range from 1.0 to 6.0 wt %, wherein XS stands for the amount of xylene solubles which are measured according to ASTM D 5492-10, a melt flow rate in the range of 1 to 10 dg/min as measured according to IS01133 (2.16 kg/230° C.) and a crystal size distribution as indicated by a height/width ratio of the highest peak of the first cooling curve of at least 0.70 W/g° C. as determined by ASTM D3418-08 using a heating and cooling rate of 10° C./min.

16 Claims, 1 Drawing Sheet

(51) Int. Cl.
  *B29C 55/12* (2006.01)
  *C08J 5/18* (2006.01)
  *B29C 55/00* (2006.01)
  *B29K 623/00* (2006.01)

(52) U.S. Cl.
  CPC ............ *C08J 5/18* (2013.01); *B29K 2623/12* (2013.01); *C08F 2800/20* (2013.01); *C08J 2323/12* (2013.01); *C08J 2323/16* (2013.01)

(56) References Cited

FOREIGN PATENT DOCUMENTS

| WO | 2014166779 A1 | 10/2014 | |
|---|---|---|---|
| WO | WO-2015091839 A1 * | 6/2015 | ............ C08F 110/06 |
| WO | 2015185490 A1 | 12/2015 | |

OTHER PUBLICATIONS

European Search Report for European Application No. 16193894.9, dated Mar. 16, 2017, 7 pages.
International Search Report and Written Opinion for International Application No. PCT/EP2017/076269, Date of Filing Oct. 16, 2017, dated Jan. 23, 2018, 13 pages.

* cited by examiner

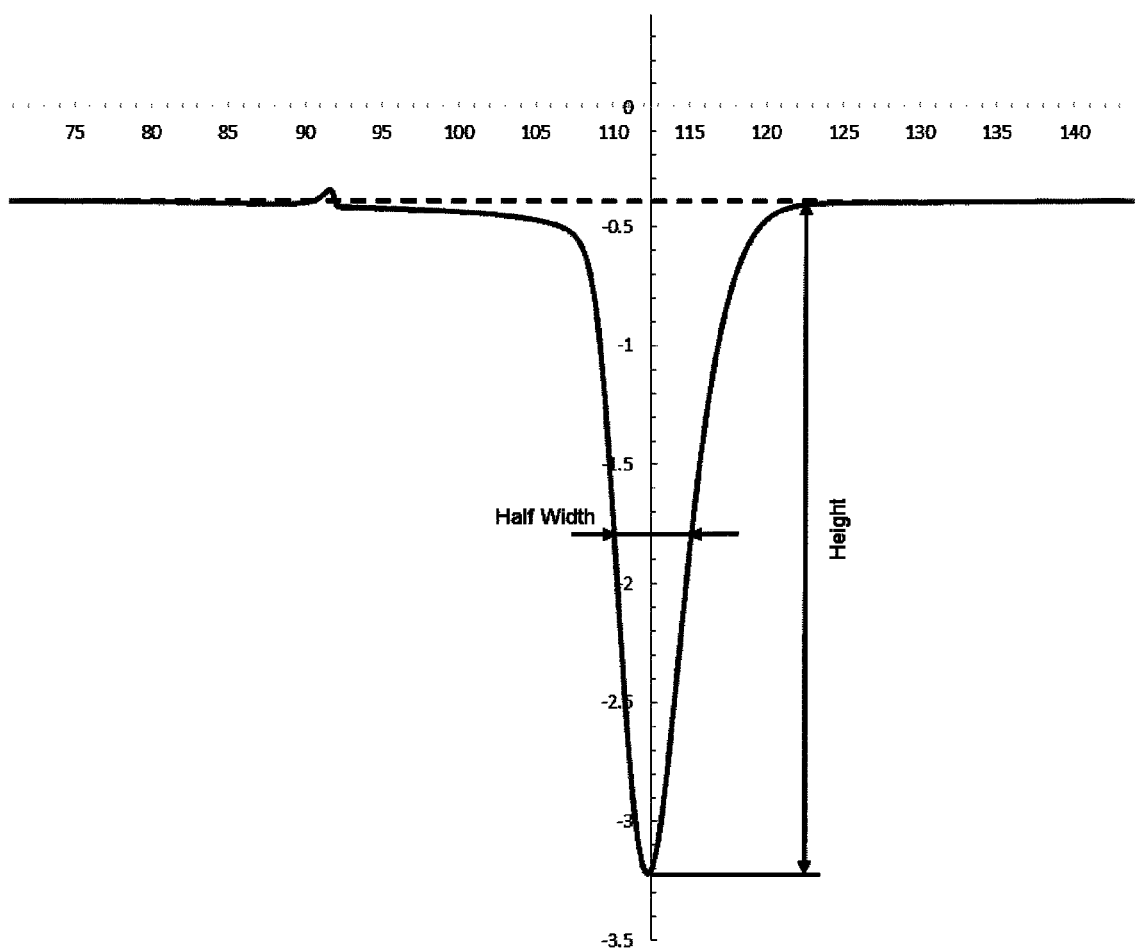

POLYPROPYLENE FOR USE IN BOPP APPLICATIONS

CROSS REFERENCE TO RELATED APPLICATIONS

This application is a National Stage application of PCT/EP2017/076269, filed Oct. 16, 2017, which claims the benefit of European Application No. 16193894.9, filed Oct. 14, 2016, both of which are incorporated by reference in their entirety herein.

The invention relates to a propylene homopolymer or propylene-ethylene copolymer, a composition comprising said propylene homopolymer or propylene-ethylene copolymer, an article comprising said propylene homopolymer or propylene-ethylene copolymer, preferably a BOPP film, a process for the production of said propylene homopolymer or propylene-ethylene copolymer, a process for the preparation of said BOPP film and to the use of the propylene homopolymer or propylene-ethylene copolymer for the preparation of an article, preferably a BOPP film.

For many applications, biaxially oriented polymer films are required. Biaxially oriented polymer films are usually prepared from reheating an unoriented polymer film to a temperature at which the crystals are partially melted and subsequently stretching it into the desired shape. The stretched film is cooled, which reforms the crystals and thereby locking the orientation into place. The properties of biaxially oriented polymer film are highly dependent on the orientation of the polymer chains.

For many biaxially oriented polymer film applications, polypropylene is the material of choice. The polypropylene chosen for such process has to meet the properties required in the end product (the biaxially oriented polypropylene film) as well as the properties required for manufacturing the film and during the stretching process.

Biaxially oriented polypropylene (BOPP) films are also known as oriented polypropylene films, and are use in a wide variety of applications, such as packaging and capacitor films.

Biaxially oriented polypropylene films may be produced through a sequential biaxial stretching process, in which films are cold drawn in two consecutive steps at two different temperatures. However, a commercial one step biaxial stretching technique also exists, which allows the production of uniform and highly oriented films at high speed while minimizing energy and production line breaks occurring during deformation. The trend towards using the faster production lines makes it necessary to develop new polymeric compositions that resist the stress encountered during processing without loss of mechanical and optical properties. Depending on the end-use, polypropylene intended for the production of BOPP films, the so-called BOPP grades, therefore has to meet some important challenges.

For BOPP grades, for a good processability, a xylene soluble content of at most 6 wt % based on the polypropylene and a molecular weight distribution (Mw/Mn) of at least 5.0 is desired. However, when using a higher XS, the haze of BOPP films produced from such BOPP grades usually increases. An increase in haze, that is, a decrease in transparency is undesired in many packaging applications, as the consumer desired to see the content of the packaging. In addition, for the production of certain packaging that both wraps and holds the content together, a combination of low haze (high transparency) and high stiffness of the BOPP film are desired.

However, previous attempts to provide a polypropylene for biaxially oriented polypropylene (BOPP) film having a low haze, either resulted in low stiffness or in the mandatory use of a nucleating agent or clarifying agent to get the stiffness to an acceptable level.

For example, WO98/58784 discloses a method of controlled nucleation of biaxially oriented polypropylene films. The method includes the addition of an improved nucleating system that allows for even distribution of a nucleating agent in the polymer material. The improved nucleating system comprises a nucleating agent and a liquid miscible with the nucleating agent. The solution is combined with the polypropylene material and the miscible liquid removed during processing.

For example, WO03059599A1 discloses a method of making a biaxially oriented polypropylene film using a tenter-frame. The method includes low concentrations of a nucleating system mixed with polypropylene which allows better processability and improved tensile properties (stiffness). The nucleating system comprises a blend of nucleating agents: monocarboxylic acid and dicarboxylic acid. The nucleating system is combined with the polypropylene and hot melt blended then formed into biaxially oriented film.

CN101597401 discloses a BOPP grade having high permeability, high rigidity (stiffness), excellent transparency and gloss for cigarette packaging film without affecting the processing performance is obtained by including a nucleating agent consisting of 2,2-methylene-bis (4,6-di-t-butyl phenoxy) phosphate.

However, with increasingly stringent regulations for the use of additives and an ever-present strive to have the most cost-optimized process, the use of (high amounts of) a nucleating agent or clarifying agent for obtaining good processing, low haze and high stiffness is undesired.

Therefore, it is an object of the invention to provide polypropylene for the manufacture of biaxially oriented polypropylene (BOPP) films (at high line speeds) which show a low haze in combination with a high stiffness, wherein the stiffness of the film obtained from the polypropylene is increased without the need for a nucleating agent or clarifying agent.

This object is achieved by a propylene homopolymer or propylene-ethylene copolymer having an ethylene content of at most 1.0 wt % based on the propylene-ethylene copolymer having
- an Mw/Mn in the range from 5.0 to 12, wherein Mw stands for the weight average molecular weight and Mn stands for the number average weight and wherein Mw and Mn are measured according to ASTM D6474-12
- an XS in the range from 1.0 to 6.0 wt %, wherein XS stands for the amount of xylene solubles which are measured according to ASTM D 5492-10.
- a melt flow rate in the range of 1 to 10 dg/min as measured according to ISO1133 (2.16 kg/230° C.)
- a crystal size distribution as indicated by a height/width ratio of the highest peak of the first cooling curve of at least >0.70 W/g° C. as determined by ASTM D3418-08 using a heating and cooling rate of 10° C./min.

It has been found that BOPP films prepared from said polypropylene have a high stiffness and a low haze. In addition, the polypropylene of the invention may show one or more of the following advantages: good processing, good film appearance, such as high gloss and/or low gel count; and/or a uniform film thickness (less gauge variation).

The ethylene content in the propylene-ethylene copolymer is relatively low, i.e. at most 1.0 wt % based on the propylene-ethylene copolymer. For example the ethylene content is at least 0.1 wt %, for example at least 0.2 wt %, for example at least 0.3 wt %, for example at least 0.4 wt %, for example at least 0.5 wt % and/or for example at most 1.0 wt %, for example at most 0.7 wt % based on the propylene-ethylene copolymer. By using a propylene-ethylene copolymer for the preparation of a BOPP film instead of a propylene homopolymer, processability may be improved.

Within the framework of the invention, with propylene-ethylene copolymer is meant a random propylene-ethylene copolymer.

For a good high speed processing behavior for the preparation of a BOPP film, it is preferred that the propylene homopolymer or propylene-ethylene copolymer according to the invention has an average molecular weight Mw of at least 400 kmol, for example of at least 450 kmol and/or for example of at most 600 kmol.

In order to have less gauge variation in the film, in other words, to be able to prepare a film having a uniform thickness and/or with an acceptable high speed processing behavior, it is preferred that the propylene homopolymer or propylene-ethylene copolymer has a molecular weight distribution (MWD) of at least 5.0, for example at least 6.0 and/or at most 12, for example at most 9.0, for example the propylene homopolymer or propylene-ethylene copolymer according to the invention has a molecular weight distribution in the range from 6.0 to 9.0, wherein MWD is calculated by dividing the Mw by the number average molecular weight Mn and wherein Mw and Mn are measured according to ASTM D6474-12.

In order to achieve a good high speed processing for the preparation of a BOPP film, it is preferred that the propylene homopolymer or propylene-ethylene copolymer of the invention has an XS of at most 4.5 wt %, preferably at most 4.0 wt %, for example at most 3.5 wt %, for example at most 3.0 wt % and/or preferably at least 1.0 wt %, for example at least 1.5 wt % based on the propylene homopolymer or propylene-ethylene copolymer. XS stands for the amount of xylene solubles which are measured according to ASTM D 5492-10.

For a good stretcheability of the BOPP film, it is preferred that the propylene homopolymer or propylene-ethylene copolymer of the invention has an isotacticity of at most 97 wt % based on the propylene homopolymer or propylene-ethylene copolymer. For the best mechanical and/or optical BOPP film properties, it is preferred that the homopolymer or propylene-ethylene copolymer of the invention has an isotacticity of at least 89 wt %, for example at least 90 wt %, for example at least 91 wt, for example at least 92 wt %, for example at least 93 wt %, wherein the isotacticity is determined using $^{13}C$ NMR.

The propylene homopolymer or propylene-ethylene copolymer of the invention has a crystal size distribution as indicated by a height/width ratio of the highest peak in the first cooling curve of at least 0.70 W/g° C., for example of at least 0.75 W/g° C., for example of at least 0.80 W/g° C. as determined by ASTM D3418-08 using a heating and a cooling rate of 10° C./min.

The height/width ratio is a measure for the homogeneity of the crystals in the propylene homopolymer or propylene-ethylene copolymer. A higher height/width ratio indicates a narrower crystal size distribution and therefore a more homogeneous crystallinity.

The propylene homopolymer or propylene-ethylene copolymer of the invention has a melt flow rate in the range of 1 to 10 dg/min, for example a melt flow rate of at least 2 dg/min and/or at most 8 dg/min, for example at most 6 dg/min as measured according to ISO1133 (2.16 kg/230° C.). For example the propylene homopolymer or propylene-ethylene copolymer of the invention has a melt flow rate in the range 2 to 6 dg/min as measured according to ISO1133 (2.16 kg/230° C.).

In another aspect, the invention relates to a composition comprising the propylene homopolymer and/or propylene-ethylene copolymer of the invention and optionally up to 5000 ppm additives, preferably at most 4000 ppm, for example at most 3000 ppm additives, for example at most 2500 ppm additives, for example at most 2000 ppm additives, for example at most 1500 ppm additives. For example, the composition may consist of at least 95 wt %, for example at least 96 wt %, for example at least 97 wt %, for example at least 98 wt % of the homopolymer and/or propylene-ethylene copolymer of the invention based on the composition.

The polypropylene homopolymer and/or propylene-ethylene copolymer or the composition of the invention may suitably be used for applications, such as for flexible packaging (film (e.g. BOPP film)), for thermoforming or for thin-wall injection molding).

Therefore, in another aspect, the invention relates to a biaxially oriented polypropylene (BOPP) film comprising the propylene homopolymer and/or propylene-ethylene copolymer or the composition of the invention.

Examples of BOPP film applications include but are not limited to (snack food) wrappings, for example transparent cups, containers, trays or thin wall packaging; packaging tape, electronic components wrapping, cigarette overwrap, dielectrical films for capacitor or metallisable films etc.

In a special embodiment, the biaxially oriented polypropylene (BOPP) film of the invention has a tensile modulus as measured according to ASTM D882 in transversal direction (TD) of at least 5.0 GPa (at least 5000 N/mm$^2$) and/or a haze value as measured using ASTM D1003 of at most 1.0 wt %.

The thickness of such BOPP film is typically in the range from 12 to 45 μm, for example in the range from 10 to 18 μm.

Preferably the BOPP film comprises at least 95 wt %, for example at least 96 wt %, for example at least 97 wt %, for example at least 98 wt %, for example consists of the polypropylene homopolymer and/or propylene-ethylene copolymer of the invention or of the composition of the invention.

The biaxially oriented polypropylene (BOPP) film may contain additives, like antioxidants and/or calcium stearate, but preferably no other polymer than the propylene homopolymer and/or propylene-ethylene copolymer of the invention. Thus the remaining part up to 100 wt % may be supplemented by additives known to the person skilled in the art, like antioxidants and/or calcium stearate. Therefore, preferably, the biaxially oriented polypropylene (BOPP) film comprises the polypropylene homopolymer and/or the propylene-ethylene copolymer of the invention, wherein the remaining part up to 100 wt % of the BOPP film consists of additives but no other polymer.

Biaxially oriented polypropylene (BOPP) film as defined herein is a biaxially oriented film, which is a film that has been obtained by subjecting polypropylene to a stretching process in 2 directions. The BOPP film can be prepared by conventional stretching (drawing) processes and under conditions known to the person skilled in the art. Conditions for a biaxial (consecutive) stretching process are for example described in WO2015091839, hereby incorporated by reference.

The biaxially oriented polypropylene (BOPP) film of the invention may have a draw ratio of at least 3.0 times, for example at least 4.0 times, in machine direction (MD) and/or at least 6.0 times, for example at least 7.0 times in transverse direction (TD). For example, the biaxially oriented polypropylene (BOPP) film may have a draw ratio in the range from 3.0 to 7.0, for example in the range from 4.0 to 6.0 times in machine direction and/or for example in the range from 6.0 to 12.0, for example in the range from 7.0 to 11.0 times in transverse direction (TD).

The BOPP film of the invention can suitably be prepared by a process, comprising the steps of
(a) providing the propylene homopolymer and/or the propylene-ethylene copolymer of the invention or prepared according to the process of the invention, b) stretching the propylene homopolymer and/or the propylene-ethylene copolymer of step a) in machine direction (MD) and transverse direction (TD). As is known to the person skilled in the art, the stretching of the propylene homopolymer and/or the propylene ethylene copolymer of the invention in MD and TD may be carried out in one step, or in consecutive steps.

In yet another aspect, the invention relates to the use of the propylene homopolymer and/or the propylene-ethylene copolymer or of the composition of the invention or prepared according to the process of the invention for the preparation of an article or for the preparation of a biaxially oriented film.

In another aspect, the invention relates to an article comprising the propylene homopolymer and/or the propylene-ethylene copolymer of the invention or the composition of the invention or the biaxially oriented polypropylene (BOPP) film of the invention.

The person skilled in the art is aware how to prepare a propylene homopolymer or propylene-ethylene copolymer. The preparation of propylene homopolymers and propylene-ethylene copolymers is, for example, described in Moore, E. P. (1996) Polypropylene Handbook. Polymerization, Characterization, Properties, Processing, Applications, Hanser Publishers: New York.

Polypropylene homopolymers and propylene-ethylene copolymers can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

In another aspect, the invention relates to a process for the production of a propylene homopolymer or a propylene-ethylene copolymer of the invention comprising the step of polymerizing propylene and optional ethylene comonomers in the presence of a catalyst to obtain the propylene homopolymer or the propylene-ethylene copolymer, wherein said catalyst is obtainable by a process comprising the steps of
A) providing a Ziegler-Natta procatalyst comprising contacting a magnesium-containing support with
  i) a halogen-containing titanium compound,
  ii) ethylbenzoate as an activator,
  iii) and as internal donor an aminobenzoate compound according to formula B:

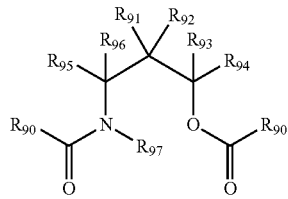

wherein each $R^{90}$ group is independently a substituted or unsubstituted aromatic group; $R^{91}$, $R^{92}$, $R^{93}$, $R^{94}$, $R^{95}$, and $R^{96}$ are each independently selected from a hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is a nitrogen atom; O is an oxygen atom; and C is a carbon atom; preferably 4-[benzoyl(methyl)amino]pentan-2-yl benzoate (AB); and
  B) contacting said Ziegler-Natta procatalyst obtained in step A) with a co-catalyst and at least one external electron donor to obtain said catalyst;
  preferably wherein step A) to provide the Ziegler-Natta procatalyst comprises the following steps:
    i) contacting a compound $R^4{}_z MgX^4{}_{2-z}$ with an alkoxy- or aryloxy-containing silane compound to give a first intermediate reaction product, being a solid $Mg(OR)_x X^1{}_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2, x is in a range of larger than 0 and smaller than 2, being 0<x<2;
    ii) optionally contacting the solid $Mg(OR^1)_x X^1{}_{2-x}$ obtained in step ii) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$ and is either 3 or 4; w<v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms;
    iii) contacting the first or second intermediate reaction product, obtained respectively in step i) or ii), with the halogen-containing Ti-compound; the activator; and the internal electron donor
to obtain said Ziegler-Natta procatalyst;

Preferably in said process, as external donor in step B) a phthalate free donor, for example di(isopropyl) dimethoxysilane, is used.

In case a phthalate-free catalyst, such as the above described catalyst using a phthalate free external donor, is used, the propylene homopolymer or propylene-ethylene copolymer of the invention is essentially phthalate-free. This is advantageous as more and more consumers try to avoid any contact with phthalates.

Therefore, preferably, the propylene homopolymer, propylene-ethylene copolymer or the composition of the invention, the BOPP film of the invention and/or the article of the invention are essentially phthalate-free.

For purposes of the invention, essentially phthalate-free is defined as the presence of less than 0.0001 wt % of phthalates based on the propylene homopolymer and/or propylene-ethylene copolymer, preferably 0.00000 wt % of phthalates based on the propylene homopolymer and/or propylene-ethylene copolymer.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Example 1

Step A) Butyl Grignard Formation

A 1.7 L stirred flask, fitted with a reflux condenser and a funnel, was filled with magnesium powder (40.0 g, 1.65 mol). The flask was brought under nitrogen. The magnesium was dried at 80° C. for 2 hours under nitrogen purge, after which dibutyl ether (200 ml), iodine (0.05 g) and n-chlorobutane (10 ml) were successively added and stirred at 120 rpm. The temperature was maintained at 80° C. and a mixture of n-chlorobutane (146 ml) and dibutyl ether (1180 ml) was slowly added over 3 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride with a concentration of 0.90 mol Mg/L was obtained.

Step B) Preparation of the First Intermediate Reaction Product

The solution of reaction product of step A (500 ml, 0.45 mol Mg) and 260 ml of a solution of tetraethoxysilane (TES) in dibutyl ether (DBE), (47 ml of TES and 213 ml of DBE), were cooled to 5° C., and then were fed simultaneously to a mixing device (minimixer) of 0.45 ml volume equipped with a stirrer and jacket. The minimixer was cooled to 5° C. by means of cold water circulating in the minimixer's jacket. The stirring speed in the minimixer was 1000 rpm. From the mixing device, the mixed components were directly dosed into a 1.3 liter reactor fitted with blade stirrer and containing 350 ml of dibutyl ether. The dosing temperature of the reactor was 35° C. and the dosing time was 360 min. The stirring speed in the reactor was 250 rpm at the beginning of dosing and was gradually increased up to 450 rpm at the end of dosing stage. On completion of the dosing, the reaction mixture was heated up to 60° C. in 30 minutes and held at this temperature for 1 hour. Then the stirring was stopped and the solid substance was allowed to settle. The supernatant was removed by decanting. The solid substance was washed three times using with 700 ml of heptane at a reactor temperature of 50° C. for three times. A pale yellow solid substance, reaction product B (the solid first intermediate reaction product; the support), was obtained upon drying with a nitrogen purge. The average particle size of support was 20 microns.

Step C) Preparation of the Second Intermediate Reaction Product

In inert nitrogen atmosphere at 20° C. in a 1000 ml glass flask equipped with a mechanical agitator was filled with 50 g of reaction product B, dispersed in 500 ml of heptane and stirred at 250 rpm. Subsequently, a solution of 2.7 ml ethanol (EtOH/Mg=0.1) in 20 ml heptane was dosed under stirring during 1 hour. After keeping the reaction mixture at 20° C. for 30 minutes, a solution of 9.5 ml titanium tetraethoxide (TET/Mg=0.1) in 20 ml of heptane was added for 1 hour. The slurry was slowly allowed to warm up to 30° C. over 30 minutes and held at that temperature for another 2 hours. Finally, the supernatant liquid was decanted from the solid reaction product (the second intermediate reaction product C; first activated support) which was washed once with 500 ml of heptane at 30° C. and dried using a nitrogen purge.

Step D) Preparation of the Third Intermediate Reaction Product

In inert nitrogen atmosphere at 25° C. in a 1000 ml glass flask equipped with a mechanical agitator was filled with 50 g of second intermediate reaction product C dispersed in 500 ml of heptane and stirred at 250 rpm. Subsequently, a solution of 6.3 ml ethanol (EtOH/Mg=0.3), 20.8 ml of toluene and 37.5 ml of heptane was dosed at 25° C. under stirring during 1 hour. The slurry was slowly allowed to warm up to 30° C. over 30 minutes and held at that temperature for another 3 hours. Finally, the supernatant liquid was decanted from the solid reaction product (the third intermediate reaction product D; second activated support) which was washed once with 500 ml of heptane at 25° C. and dried using a nitrogen purge.

Preparation of the Catalyst H

Steps A-D) are carried out as in Example 1. Step E) is carried out as follows.

A 300 ml reactor-filter flask was brought under nitrogen and 125 mL of titanium tetrachloride was added, then 5.5 g of second activated support in 15 ml of heptane was added to the reactor. The contents of the reactor were stirred for 60 minutes at room 25° C. Then, 1.78 ml of ethylbenzoate, EB (EB/Mg=0.30 molar ratio) in 4 ml of chlorobenzene was added to the reactor in 30 minutes. Temperature of reaction mixture was increased to 115° C. and then the reaction mixture was stirred at 115° C. for 90 minutes (I stage of catalyst preparation). The contents of the flask were filtered, after which the solid product was washed with chlorobenzene (125 ml) at 100 to 105° C. for 20 minutes. Then, the contents of the flask were filtered. A mixture of titanium tetrachloride (62.5 ml) and chlorobenzene (62.5 ml) was added to the reactor. The reaction mixture was stirred at 115° C. for 60 minutes (II stage of catalyst preparation). Then, the contents of the flask were filtered. A mixture of titanium tetrachloride (62.5 ml) and chlorobenzene (62.5 ml) was added to the reactor. Then, 0.51 g of 4-[benzoyl(methyl)amino]pentan-yl benzoate (AB/Mg=0.04) in 4 ml of chlorobenzene was added to the reactor in 10 minutes. The reaction mixture was stirred at 115° C. for 30 minutes (III stage of catalyst preparation). Then, the contents of the flask were filtered. A mixture of titanium tetrachloride (62.5 ml) and chlorobenzene (62.5 ml) was added to the reactor. The reaction mixture was stirred at 115° C. for 30 minutes (IV stage of catalyst preparation). Then, the contents of the flask were filtered. The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid catalyst H produced is given in Table 1.

TABLE 1

Composition of solid catalyst H

| Catalyst | Example | d50 [μm] | Mg [%] | Ti [%] | ID [%] | Activator (EB) [%] | EtO [%] |
|---|---|---|---|---|---|---|---|
| H | 8 | 22.16 | 19.65 | 2.40 | 8.41 | 6.68 | 1.48 |

Catalyst CE

Catalyst CE is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

Polypropylene was produced in a scaled down (pilot plant) version of an Innovene™ PP process (gas phase technology for the production of polypropylene (PP)).

The (pilot) plant process consisted of two horizontally stirred gas-phase reactors in series in with an intermediate powder transfer system and downstream powder processing units (=degassing & catalyst deactivation) for powder collection.

Reactor 1 & Reactor 2 were both operated at 150° F. (65.6° C.), 320 psig (22.1 bar). H2/C3 ratios in both reactors were controlled independently such that the melt flow rate produced at Reactor 1 is the same at the melt flow rate (MFR) of the powder collected at Reactor 2. (In practice, this means that both reactors were operated at nearly the same H2/C3-ratio (Approximate H2/C3=0.012 mol/mol).

Amount of catalyst, dosed to Reactor 1 via the catalyst nozzle as slurry in hexane, was such to allow for maximum production rate in the pilot plant. Cocatalyst (TEAl) and External Donor (DIPDMS) were dosed via a separate nozzle to the reactor (as a premixed mixture) and in ratio to the catalyst flow.

The process conditions as given in Table 2 were used:

TABLE 2

Process conditions.

| | catalyst | donor | Al/Ti | Si/Ti | $H_2/C_3$ |
|---|---|---|---|---|---|
| Example 1 | H | DiPDMS | 118 | 8 | 0.015 |
| Example 2 | H | DiPDMS | 118 | 2 | 0.013 |
| Comparative example 1 (CE1) | CE | DiBDMS | 59 | 4.4 | 0.0026 |
| Comparative example 2 (CE2) | CE | DiBDMS | 59 | 1.1 | 0.0016 |

DiPDMS: di-(isopropyl)-dimethoxysilane
DiBDMS: di(isobutyl)-dimethoxysilane

The powder was collected and granulate was prepared by melt-mixing the powder with the appropriate additives in a single screw extruder. The additives (antioxidants, acid scavengers) were used in an amount of 1300 ppm based on the powder and mixed prior to dosing to the extruder. The temperature profile in the extruder was 20-20-30-50-100-170-220-220-240° C., at a throughput of 13 kg/h at 200 rpm.

Methods

MWD, Mn, Mw

Mw, Mn and Mz were all measured according to ASTM D6474-12 (Standard Test Method for Determining Molecular Weight Distribution and Molecular Weight Averages of Polyolefins by High Temperature Gel Permeation Chromatography). Mw stands for the weight average molecular weight and Mn stands for the number average weight. Mz stands for the z-average molecular weight.

Cold Xylene Solubles (XS)

XS, wt % is xylene solubles, measured according to ASTM D 5492-10. 1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes places with stirring for 5 min. The closed flask is then kept for 30 min in a thermostatic water bath at 25° C. for 30 min. The so formed solid is filtered on filtering paper. 25 ml of the filtered liquid is poured in a previously weighed aluminium container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

Isotacticity

"APP wt. %" or "weight percentage of atactic polypropylene" as used in the present description means: the fraction of polypropylene obtained in a slurry polymerization that is retained in the solvent. APP can be determined by taking 100 ml of the filtrate ("y" in millilitres) obtained during separation from polypropylene powder after slurry polymerization ("x" in grammes). The solvent is dried over a steam bath and then under vacuum at 60° C. That yields APP ("z" in grammes). The total amount of APP ("q" in grammes) is (y/100)*z. The weight percentage of APP is (q/(q+x))*100%.

The isotacticity is 100 wt %−APP (in wt %).

The isotacticity was measured using $^{13}$C NMR.

Crystal Size Distribution

The crystallization temperature, the crystallinity and the melting temperature are measured according to ASTM D3418-08 at a heating rate of 10° C./min in DSC. The sample is heated up to 200° C. (first heating) and then cooled at a cooling rate 10° C./min of (to measure the crystallization temperature and crystallinity) and then heated a second time at a heating rate of 10° C./min (second heating) to measure the melting temperature (Tm) and heat of fusion (W). In order to determine the crystal size distribution, a 5 mg polymer sample was measured.

Crystal size distribution is described by the height/width ratio of the highest peak in the cooling (crystallization) thermograms according to the DSC method.

For determining the height/width ratio, the analysis as described by A. K. GUPTA,*S. K. RANA, and B. 1. DEOPURA, Journal of Applied Polymer Science, Vol. 44, 719-726 (1992)), was applied.

FIG. 1 (FIG. 1) is the cooling thermogram of comparative example 1 (CE1) and shows the determination of the height/width ratio (crystal size distribution). In FIG. 1, the height and the width of the highest peak have been indicated (in this case, only one peak was present in the thermogram). As can be seen the width is determined at half height. The heat of fusion (W) was normalized to W/g sample.

The height, the width at half height (width) and the ratio of the height/width (crystal size distribution) of the highest peak in the DSC cooling curve of examples 1 and 2 and CE1, CE2 and CE3 is indicated in Table 3 below.

A higher height/width ratio exhibits a narrower crystal size distribution and therefore a more homogeneous crystallinity.

Melt Flow Rate (MFR)

For purpose of the invention the melt flow rate is the melt flow rate as measured according to ISO1133 (2.16 kg/230° C.).

Haze

The determination of the Haze and values was carried out in accordance with the standard ASTM D1003 at 23° C. at 50% relative humidity. The test specimens were BOPP films, which are prepared as described below.

Stiffness (Tensile Modulus)

For purpose of the present invention, stiffness of the BOPP film prepared as described below, was determined by measuring the tensile modulus (1% secant) according to ASTM D882 at 23° C., 50% relative humidity, at a speed of 25 mm/min, sample length of 250 mm in machine direction (MD), also indicated herein as (II), and transversal direction (TD), also indicated herein as (L).

Preparation of BOPP Films

Extrusion of PP Sheets

A non-stretching sheet, with a thickness and width of 500 μm and 270 mm respectively, was made by an extrusion line ZE25Ax42D with a discharge amount of 16 kg/hr. The extrusion was carried out at 240° C. and the chill-roll temperature was set to 35° C. The take-off speed was 2.6 m/min. No draw ratio was subjected on the MDO unit after extrusion. Approximately 10-15 m sheet was winded of each sample that was produced for further stretching trials.

Stretching Using a Biaxial Stretching Machine.

BOPP films were produced on the biaxial stretching machine KARO IV. The biaxial stretching was performed in the sequential or in the simultaneous stretching mode. The stretching temperature was 160° C.

The conditions during the stretching process are summarized in table 4 below.

TABLE 3

Stretching conditions on the KARO IV.

| Sheet Thickness [μm] | Sheet dimensions [μm] | Stretch. oven temp [° C.] | Pre-heat time [S] | Speed MD/TD [%/s] | Stretch. ratio [MD × TD] | Speed profile |
|---|---|---|---|---|---|---|
| 500 | 90 × 90 | 160 | 30 | 400 | 5 × 10 | SEQ |

The final BOPP film was prepared by stretching the extruded 500 μm sheet 5×10 in sequential mode. This stretching was performed at the temperature T=160° C.

Results:

The results of the experiments are shown in Table 4 below:

TABLE 4

| | example | | | |
|---|---|---|---|---|
| | Example 1 | CE1 | CE2 | Example 2 |
| Molecular characterization | | | | |
| Mw (kmol) | 480 | 400 | 430 | 430 |
| Mn | 65 | 75 | 72 | 55 |
| Mz/Mw | 4.3 | 2.9 | 3.3 | 3.9 |
| MWD = Mw/Mn | 7.3 | 5.3 | 5.9 | 7.8 |
| XS (wt %) | 2.0 | 1.9 | 2.9 | 3.4 |
| Isotacticity (wt %) | 95.4 | 95.4 | 92.7 | 94.2 |
| Tm ($2^{nd}$ heating), (° C.) | 164.7 | 163 | 163 | 163 |
| Height (W/g) | 3.26 | 2.82 | 3.1 | 3.72 |
| Width (° C.) | 4.5 | 5 | 4.8 | 4.2 |
| Height/width ratio (W/g° C.) | 0.72 | 0.56 | 0.65 | 0.89 |
| MFI (g/10 min) | 2.6 | 3.6 | 2.7 | 2.5 |
| properties | | | | |
| Tensile modulus (II) (BOPP film) in GPa | 2.7 | 2.8 | 2.4 | 2.6 |
| Tensile modulus (L) (BOPP film) in GPa | 5.7 | 4.3 | 4.7 | 4.7 |
| Haze (wt %) | <1.0 | <1.0 | 1.2 | <1.0 |

CONCLUSION

As can be seen from Table 4, the polypropylenes of the invention show a higher stiffness (high tensile modulus (L)) on the BOPP film prepared from the polypropylenes of the invention (at comparable XS values) as compared to the comparative examples. For example, when comparing example 1 to comparative example CE1, the tensile modulus (L) of the BOPP film is 5.7 versus 4.3 GPa. As can be seen from the above Table 4, the tensile modulus decreases with increasing XS. Therefore, it is surprising that the tensile modulus (L) of the BOPP film of example 2 having an XS of 3.4 wt % is the same as the tensile modulus (L) of the BOPP film of the comparative example CE2 having a significantly lower XS of 2.9 wt %.

In addition, Table 4 also shows that the polypropylenes of the invention show a low haze (below 1.0 wt %) when used in a BOPP film.

The examples 1 and 2 of the invention show a higher height/width ratio than the comparative examples CE1 and CE2. A higher height/width ratio indicates a narrower crystal size distribution, which indicates a more homogeneous crystallinity. In Table 4, it is shown that this higher height/width ratio leads to a better BOPP film appearance in terms of lower haze and also to an increased stiffness at comparable XS.

Therefore, a propylene homopolymer or propylene-ethylene copolymer having an ethylene content of at most 1.0 wt % based on the propylene-ethylene copolymer having
- an Mw/Mn in the range from 5.0 to 12, wherein Mw stands for the weight average molecular weight and Mn stands for the number average weight and wherein Mw and Mn are measured according to ASTM D6474-12
- an XS in the range from 1.0 to 6.0 wt %, wherein XS stands for the amount of xylene solubles which are measured according to ASTM D 5492-10.
- a melt flow rate in the range of 1 to 10 dg/min as measured according to ISO1133 (2.16 kg/230° C.)
- a crystal size distribution as indicated by a height/width ratio of the highest peak of the first cooling curve of at least 0.70 W/g° C. as determined by ASTM D3418-08 using a heating and cooling rate of 10° C./min, can suitably be used for the preparation of BOPP films having a low haze and a good stiffness.

In addition, such propylene homopolymer and/or propylene-ethylene copolymer can suitably be used to prepare stiffer BOPP films having a low haze without requiring nucleating agents or clarifying agents. This makes the BOPP films of the invention extremely suitable for use in packaging applications where a stiffness and low haze (high transparency) are desired, such as all applications that require flexible wrapping, such as for example the wrapping of flowers and cigarettes. In particular, the BOPP grades and BOPP films of the invention could also be suitable for applications where a very low additive concentration is desired, such as food and medical applications.

In addition, since the propylene homopolymer of the invention shows such a high stiffness in the BOPP film, less antioxidant/nucleating agent can be used for achieving the same stiffness as compared to the prior art, which makes the propylene homopolymer of the invention a cost effective solution in achieving high stiffness.

The invention claimed is:

1. A biaxially oriented polypropylene (BOPP) film comprising a propylene homopolymer or propylene-ethylene copolymer having an ethylene content of at most 1.0 wt % based on the propylene-ethylene copolymer, and having
   an Mw/Mn in the range from 5.0 to 12, wherein Mw stands for the weight average molecular weight and Mn stands for the number average weight and wherein Mw and Mn are measured according to ASTM D6474-12,
   an XS in the range from 1.0 to 6.0 wt %, wherein XS stands for the amount of xylene solubles which are measured according to ASTM D 5492-10,
   a melt flow rate in the range of 1 to 10 dg/min as measured according to ISO1133 (2.16 kg/230° C.), and
   a crystal size distribution as indicated by a height/width ratio of the highest peak of the first cooling curve of at least 0.70 W/g° C. as determined by ASTM D3418-08 using a heating and cooling rate of 10° C./min, wherein the width is measured at half height of the peak.

2. The biaxially oriented polypropylene (BOPP) film according to claim 1, wherein the propylene homopolymer or propylene-ethylene copolymer has an Mw of at least 400 kmol.

3. The biaxially oriented polypropylene (BOPP) film according to claim 1, wherein the propylene homopolymer or propylene-ethylene copolymer has an Mw/Mn in the range from 6.0 to 9.0.

4. The biaxially oriented polypropylene (BOPP) film according to claim 1, wherein the propylene homopolymer or propylene-ethylene copolymer has an XS of at most 4.5 wt % based on the propylene homopolymer or propylene-ethylene copolymer.

5. The biaxially oriented polypropylene (BOPP) film according to claim 1, wherein the propylene homopolymer or propylene-ethylene copolymer has an isotacticity of at most 97 wt % based on the propylene homopolymer or propylene-ethylene copolymer, wherein the isotacticity is determined using $^{13}C$ NMR.

6. The biaxially oriented polypropylene (BOPP) film according to claim 1, wherein the propylene homopolymer or propylene-ethylene copolymer has a crystal size distribution as indicated by a height/width ratio of the highest peak of the first cooling curve of at least 0.75 W/g° C., as determined by ASTM D3418-08 using a heating and cooling rate of 10° C./min.

7. The biaxially oriented polypropylene (BOPP) film according to claim 1, wherein the propylene homopolymer or propylene-ethylene copolymer has a melt flow rate in the range of 2 to 6 dg/min as measured using to ISO1133 (2.16 kg/230° C.).

8. The biaxially oriented polypropylene (BOPP) film according to claim 1, wherein the propylene homopolymer or propylene-ethylene copolymer are essentially phthalate-free.

9. The biaxially oriented polypropylene (BOPP) film of claim 1, further comprising up to 5000 ppm of an additive.

10. The biaxially oriented polypropylene (BOPP) film of claim 1, comprising at least 95 wt % of the propylene homopolymer and/or propylene-ethylene copolymer.

11. An article comprising the biaxially oriented polypropylene (BOPP) film of claim 1.

12. A process for the production of the propylene homopolymer or the propylene-ethylene copolymer of claim 1 comprising the step of polymerizing propylene and optional ethylene comonomers in the presence of a catalyst to obtain the propylene homopolymer or the propylene-ethylene copolymer, wherein said catalyst is obtained by a process comprising the steps of
   A) providing a Ziegler-Natta procatalyst comprising contacting a magnesium-containing support with
      i) a halogen-containing titanium compound,
      ii) ethylbenzoate as an activator,
      iii) and as internal donor an aminobenzoate compound according to formula B:

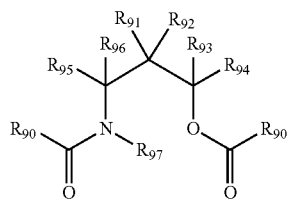

wherein
- each $R^{90}$ group is independently a substituted or unsubstituted aromatic group;
- $R^{91}$, $R^{92}$, $R^{93}$, $R^{94}$, $R^{95}$, and $R^{96}$ are each independently selected from a hydrogen or a linear, branched or cyclic hydrocarbyl group, selected from alkyl, alkenyl, aryl, aralkyl, or alkylaryl groups, and one or more combinations thereof;
- $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof;
- N is a nitrogen atom; O is an oxygen atom; and C is a carbon atom; and B) contacting said Ziegler-Natta procatalyst obtained in step A) with a co-catalyst and at least one external electron donor to obtain said catalyst.

13. The process according to claim 12, wherein the external donor in step B) is a phthalate free donor.

14. A process for the preparation of a biaxially oriented film according to claim 1, comprising the steps of
   (a) providing a sheet comprising the propylene homopolymer or the propylene-ethylene copolymer, and
   b) stretching the sheet comprising the propylene homopolymer and/or the propylene-ethylene copolymer of step a) in machine direction (MD) and transverse direction (TD).

15. The process according to claim 12, wherein step A) to provide the Ziegler-Natta procatalyst comprises the following steps:
   i) contacting a compound $R^4{}_z MgX^4{}_{2-z}$ with an alkoxy- or aryloxy-containing silane compound to give a first intermediate reaction product, being a solid $Mg(OR^1)_x X^1{}_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted and may contain one or more heteroatoms; $X^4$ and $X^1$ are each independently selected from the group of consisting of fluoride (F—), chloride (Cl—), bromide (Br—) or iodide (I—); z is in a range of larger than 0 and smaller than 2, being $0<z<2$, x is in a range of larger than 0 and smaller than 2, being $0<x<2$;
   ii) optionally contacting the solid $Mg(OR^1)_x X^1{}_{2-x}$ obtained in step ii) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$ and is either 3 or 4; $w<v$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof, and wherein said hydrocarbyl group may be substituted or unsubstituted;
   iii) contacting the first or second intermediate reaction product, obtained respectively in step i) or ii), with the halogen-containing Ti-compound; the activator; and the internal electron donor,
   to obtain said Ziegler-Natta procatalyst.

16. The process according to claim 12, wherein the Ziegler-Natta procatalyst is 4-[benzoyl(methyl)amino]pentan-2-yl benzoate, and the external electron donor is di(isopropyl) dimethoxysilane.

\* \* \* \* \*